(12) United States Patent
Welton (10) Patent No.: US 9,081,772 B1
(45) Date of Patent: Jul. 14, 2015

(54) METHOD AND APPARATUS FOR ACID VALIDATION WITHIN A DISTRIBUTED RELATIONAL DATABASE UNDER CONTROLLED CONCURRENT WORKLOADS

(75) Inventor: Caleb E. Welton, Foster City, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 492 days.

(21) Appl. No.: 13/457,153

(22) Filed: Apr. 26, 2012

(51) Int. Cl.
 *G06F 17/30* (2006.01)
(52) U.S. Cl.
 CPC ..................................... *G06F 17/30* (2013.01)
(58) Field of Classification Search
 CPC ............................................. G06F 17/30286
 USPC ....................................................... 707/827
 See application file for complete search history.

(56) References Cited

U.S. PATENT DOCUMENTS

| | | | | |
|---|---|---|---|---|
| 5,819,268 A | * | 10/1998 | Hackett | 707/690 |
| 5,937,426 A | * | 8/1999 | Sokolov | 711/113 |
| 7,337,176 B1 | * | 2/2008 | Cheedella et al. | 1/1 |
| 7,895,322 B2 | * | 2/2011 | Murakami | 709/224 |
| 8,549,038 B2 | * | 10/2013 | Narasinghanallur et al. | 707/781 |
| 2008/0288682 A1 | * | 11/2008 | Laonipon et al. | 710/104 |
| 2010/0153087 A1 | * | 6/2010 | Kirtkow et al. | 703/21 |

\* cited by examiner

*Primary Examiner* — Rehana Perveen
*Assistant Examiner* — Hicham Skhoun
(74) *Attorney, Agent, or Firm* — Fish & Richardson P.C.

(57) ABSTRACT

Testing a database is disclosed. A test description defining a test of a database is received. The test description specifies a relative timing between an issuance of a first command via a first session of the database when the test is conducted and an issuance of a second command via a second session of the database when the test is conducted. The database is configured to conduct the test defined in the test description.

20 Claims, 5 Drawing Sheets

METHOD AND APPARATUS FOR ACID VALIDATION WITHIN A DISTRIBUTED RELATIONAL DATABASE UNDER CONTROLLED CONCURRENT WORKLOADS

BACKGROUND OF THE INVENTION

In a relational database, the set of well known atomicity, consistency, isolation and durability (i.e., ACID) properties of the database guarantees that transactions of the database are processed reliably. Traditionally, to test the ACID proprieties of a database, stress tests of large uncontrolled concurrency workloads were executed on the database. However the results of these tests were not easily repeatable or consistent due to the uncontrolled nature of these tests. Therefore, there exists a need for a better way to reliably test a database.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A database testing framework is disclosed. For example, ACID properties of a relational database are tested. In some embodiments, the database is tested using a test description. The test description may programmatically specify one or more database commands to be used to test the database. In addition to the database commands, the test description may specify one or more control directive commands that can be used to control the relative timing between issuances of database commands at specified sessions of the database. For example, a user is able to test the database by using the test description to controllably reproduce a situation similar to when a plurality of connections to the database are established by a plurality of end-users and multiple current commands are issued to the database through the plurality of database connections. By enabling a tester to specify and control which database test commands run on which session from a plurality of concurrent database sessions and the relative ordering of the commands to be issued to the database sessions, the tester is able to test the database in a predictable and repeatable manner.

Figure 1:
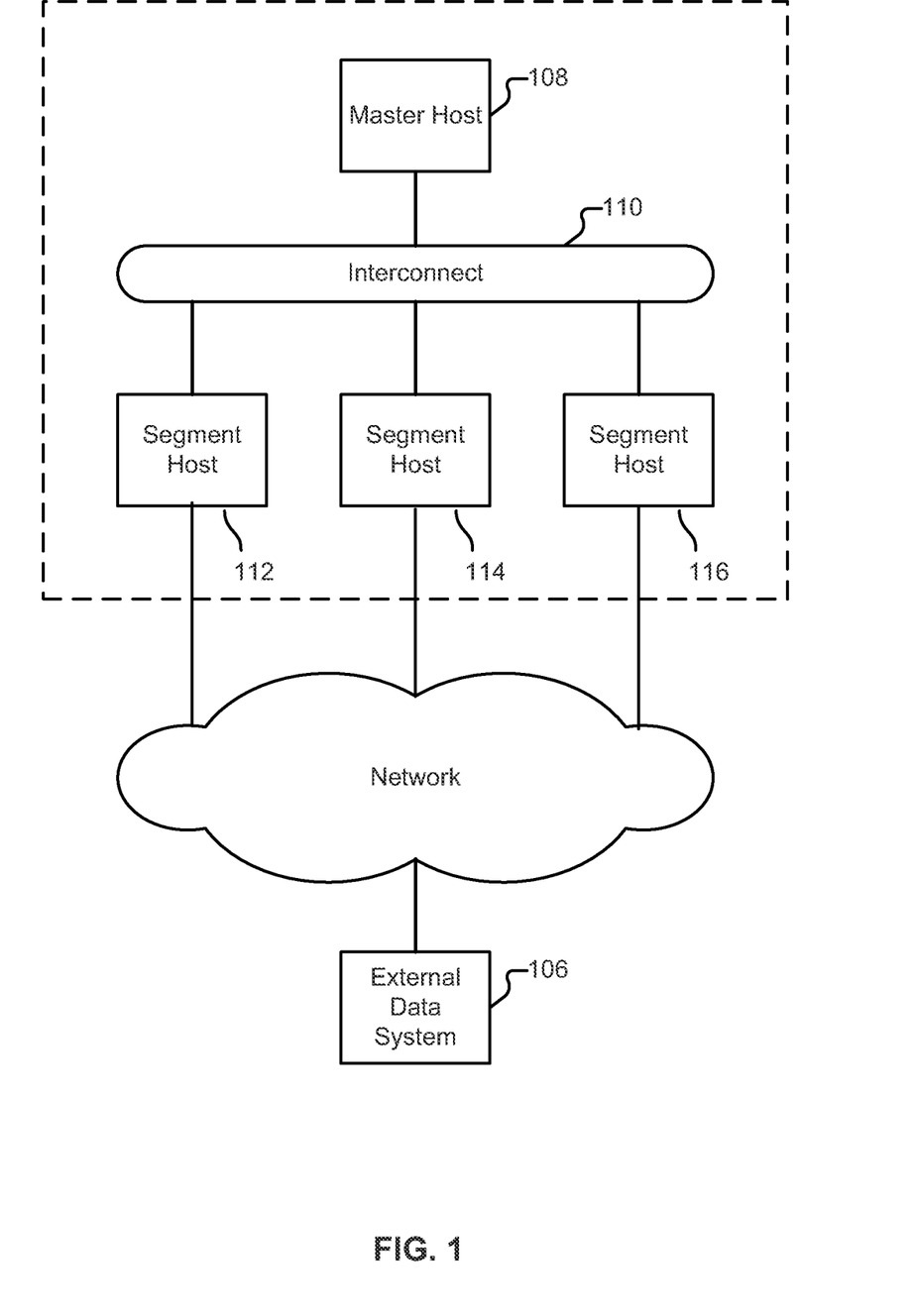
FIG. 1 is a block diagram illustrating an embodiment of a database testing environment.

FIG. 1 is a block diagram illustrating an embodiment of a database testing environment. Database system 102 is connected to external testing system 106 via network 104. Network 104 and interconnect 110 may include one or more of the following: a direct or indirect physical communication connection, mobile communication network, Internet, intranet, Local Area Network, Wide Area Network, Storage Area Network, and any other forms of connecting two or more systems or storage devices together. An example of a database includes one or more components of database system 102, software executed on one or more components of database system 102, and/or the entire system of database system 102. Database system 102 includes master host 108 connected to segment hosts 112, 114 and 116 via interconnect 110. In other embodiments, interconnect 110 is connected to network 104. For example, segment hosts 112, 114 and 116 are connected to external testing system 106 via interconnect 110, which is connected to network 104. Although three segment hosts have been shown in FIG. 1, any number of segment hosts or any other component shown in the figure may exist in various embodiments.

In some embodiments, database system 102 includes the Greenplum Database offered by EMC, Inc. of Hopkinton, Mass. that leverages parallel architecture of the Hadoop Distributed File System developed by The Apache Software Foundation. Database system 102 utilizes a shared-nothing MPP (massively parallel processing) architecture. In this architecture, database data is automatically partitioned across multiple segment hosts/servers (i.e., segment hosts 112, 114 and 116), and each segment host owns and manages a distinct portion of the overall database. Communication between hosts 108, 112, 114 and 116 are performed via a network interconnect 110. In some embodiments, database system 102 utilizes a shared-nothing MPP architecture that provides every segment host with a dedicated, independent high-bandwidth channel to its individual storage. The segment hosts are able to process database queries in a fully parallel manner, use all storage connections simultaneously, and efficiently flow data between segment hosts as needed. Master host 108 manages segment hosts 112, 114 and 116. For example, master host 108 provides query planning, query dispatch and/or coordinates MapReduce for database system 102.

In various embodiments, a test description may be processed by one or more components shown in FIG. 1. For example, the test description may be processed by one or more of the following: master host 108, segment host 112, segment host 114, segment host 116, and external testing system 106. Processing the test description may include establishing a plurality of database sessions with one or more components of database system 102. In some embodiments, database commands are programmatically issued in a controlled manner to one or more components of database system 102 (e.g., segment hosts 112, 114, and/or 116) to test one or more ACID properties of the one or more components of database system 102 and/or the entire system of database system 102.

Figure 2:
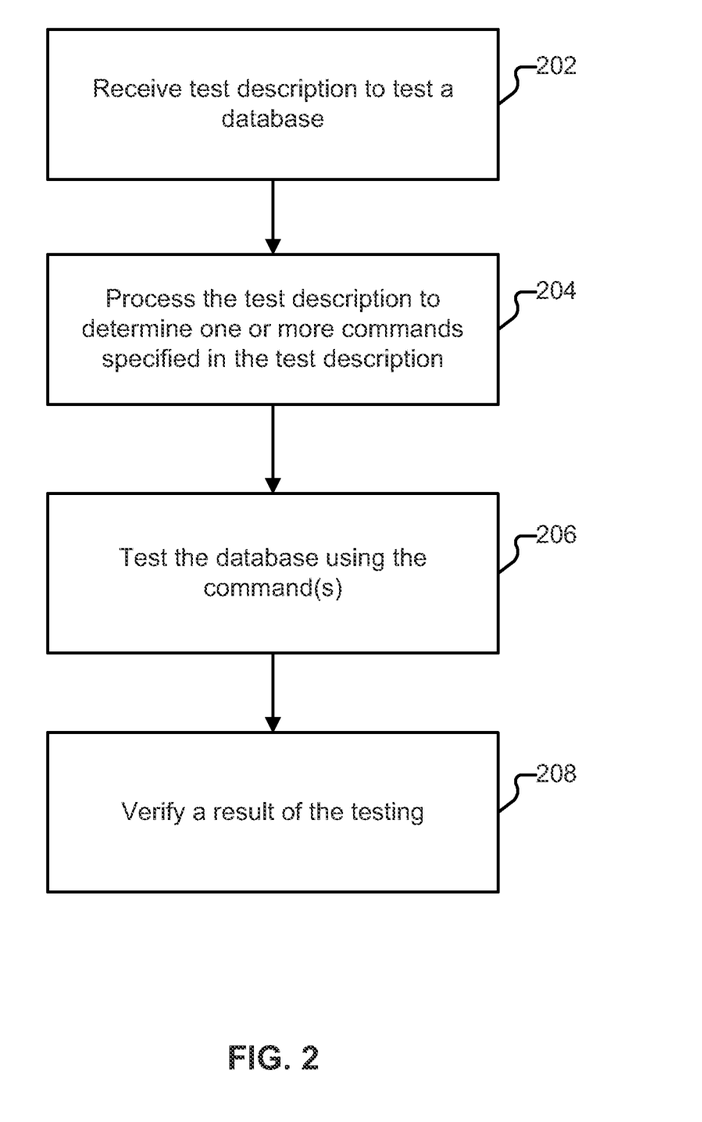
FIG. 2 is a flowchart illustrating an embodiment of a process for testing a database.

FIG. 2 is a flowchart illustrating an embodiment of a process for testing a database. The process of FIG. 2 may be at least in part implemented on one of more of the following shown in FIG. 1: master host 108, segment host 112, segment host 114, segment host 116, and external testing system 106.

At 202, a test description to test the database is received. In some embodiments, the test description leverages programmatic database language such as the Structured Query Language (SQL). For example, the test description identifies one or more database commands, such as SQL commands, to be issued to specified sessions of a database. The test description may also include one or more control directive commands that include specialized commands used to control the testing of the database. For example, an "INFO" control directive command is used to output a specified message (e.g., indicate status message to debugging output). Another example of a control directive command is a "SESSION" control directive command that is used to specify which database session will become an active database session to receive and issue specified database command(s). In another example, a "SYNC" control directive command is used to simultaneously allow a plurality of sessions of the database to process queued up database commands. Additional explanation and example uses of these control directive commands are provided later in the specification. By using the combination of the database commands and control directive commands along with the relative order of the commands in the test description, a tester is able to specify and control which database test command is issued in what order on which database session to reliably test the database. In some embodiments, the test description is included in a file. For example, in the database test description file, a tester programmatically codes database operations and associated ordering of the database operations on a plurality of concurrently executing database sessions.

At 204, the test description is processed to determine one or more commands specified in the test description. In some embodiments, determining the one or more commands includes identifying database commands and control directive commands specified in the test description. In some embodiments, control directive commands are specified using one or more predetermined characters that precede the control directive command. For example, "--@" characters (i.e., SQL comment identifier "--" plus "@") are placed before every control directive comment in the test description to identify control directive commands. In some embodiments, processing the test description includes reading the test description to tokenize text of the description as one or more coded commands and form an in-memory representation of at least a portion of the test description. For example, a SQL lexer is used to tokenize the test description file, determine statement boundaries, and identify specific test framework control directive commands.

Figure 3:
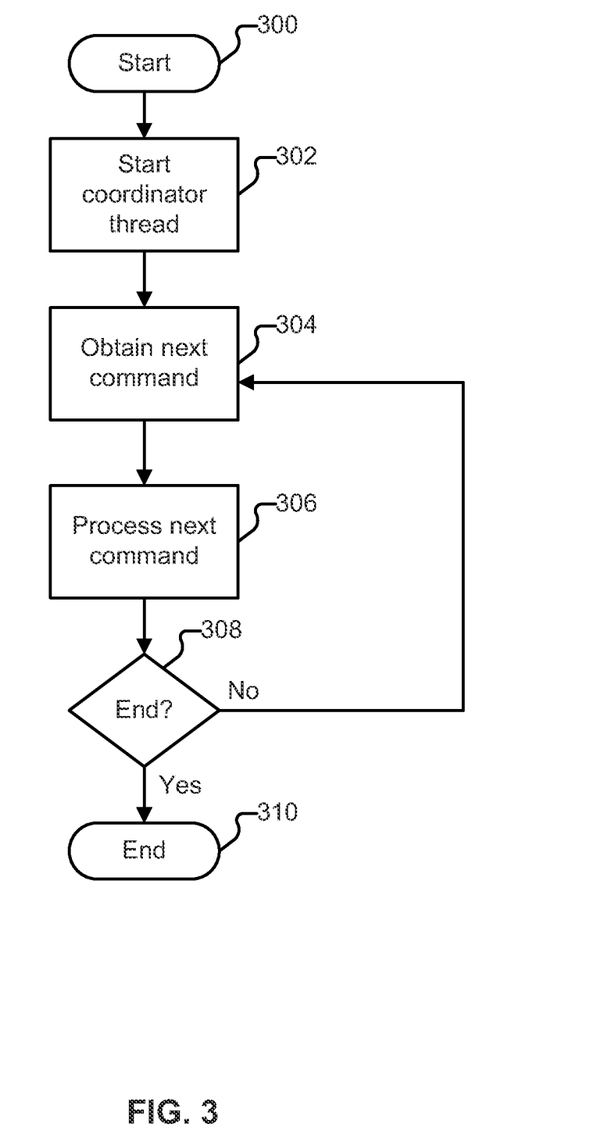
FIG. 3 is a flowchart illustrating an embodiment of a process for processing commands for a database.

In some embodiments, the processing performed in 204 is at least in part performed by a coordinator thread started in 302 of FIG. 3. In some embodiments, processing the test description at 204 includes verifying whether the test description has been correctly specified. For example, the test description is examined to determine whether commands specified in the test description are well-formed and specified using the correct syntax. If an error is detected in the verification process, an error message may be provided to a user and the process of FIG. 2 may end.

At 206, the database to be tested is tested using the determined commands. In some embodiments, testing the database includes establishing a plurality of session connections with the database and issuing the commands of the test pattern in a manner specified by the test description. In some embodiments, a new database connection thread is established for each new database session required for testing at 206. Each of these threads manages its respective database session. The thread also may manage a command queue for its database session. For example, as database commands are assigned to a database connection thread to be issued to a database via the thread's database session connection, the thread stores the issued database commands in its command queue. Thread releases the commands one by one, in first in first out order, to the database via its database session after the database finishes processing the previously issued database command. The command queue may be particularly useful in situations where database commands are queued because a previously issued database command is blocked on a concurrency control lock.

At 208, a result of the database testing is verified. In some embodiments, verifying the result of the database testing includes comparing a result of the testing against an expected result of the test. In some embodiments, verifying the result includes verifying a state (e.g., integrity) of the database after the testing.

FIG. 3 is a flowchart illustrating an embodiment of a process for processing commands for a database. In some embodiments, at least a portion of the process of FIG. 3 is included in 206 of FIG. 2. For example, steps 304, 306 and 308 are included in 206 of FIG. 2. In some embodiments, at least a portion of the process of FIG. 3 is included in 204 of FIG. 2. For example, step 302 is included in 204 of FIG. 2. The process starts at 300.

At 302, a coordinator thread is started. The coordinator thread manages the testing of a database. In some embodiments, the coordinator thread processes a database test description to determine one or more database test commands specified in the test pattern. In some embodiments, the coordinator thread establishes a connection to the database to be tested and monitors the database. For example, the coordinator thread monitors the database to determine whether the database is in a deadlock state (e.g., testing cannot be completed due to interdependency of concurrency control locks that cannot be resolved) during testing of the database. When a deadlock state is detected, the coordinator thread may end the testing and output an error. In some embodiments, the coordinator thread is responsible for controlling concurrency, timing and issuance of database commands used to test the database. For example, the coordinator thread issues database commands specified in a test description to other database session threads (e.g., threads described above that each manage a session with a database during testing of the database) in a manner specified in the test description. In some embodiments, steps 304, 306 and 308 are performed at least in part by the coordinator thread.

At 304, a next command is obtained. In some embodiments, obtaining the next command includes obtaining a next command in a group of commands determined at 204 of FIG. 2. Obtaining the next command may include obtaining a subsequent command from an ordered list of determined commands each time a next command is obtained at 304. The order of the ordered list may be associated with the order the commands were specified in a test description.

At 306, the next command received in 304 is processed. In some embodiments, processing the next command includes processing a control directive command described earlier in the specification. For example, a coordinator thread processes the control directive command. In some embodiments, processing the command includes adding the command received in 304 to a command queue of a specified database session thread.

The database session thread may issue commands in its command queue to the database via the thread's database session connection after each previously issued database command from the thread is completed.

In some embodiments, at a given time, only one database session thread is designated as the active session and is the only session allowed to actively process database commands in its queue. A control directive command may be used to specify which database session should be the one active session processing database commands in its queue. For example, if the command obtained in 304 is a database command to be added to a queue of a database session thread, the obtained command is added to the queue of the currently active session. When a new control directive command (e.g., new "SESSION" control directive command) is used to specify a different database session as the active session, the different session is not designated as the active session until either the queue of the previously active session thread is empty or the command being processed by the previously active session is waiting on a lock. Another control directive command (e.g., "SYNC" control directive command) may be used to suspend, only allowing one database session to be currently active by allowing all database session threads to actively process database commands in its queues.

At 308, it is determined whether all commands have been obtained from a group of commands (e.g., group of commands determined at 204 of FIG. 2). If it is determined all commands have not been received, the process returns to 304. If it is determined all commands have been received, the process ends at 310.

Figure 4:
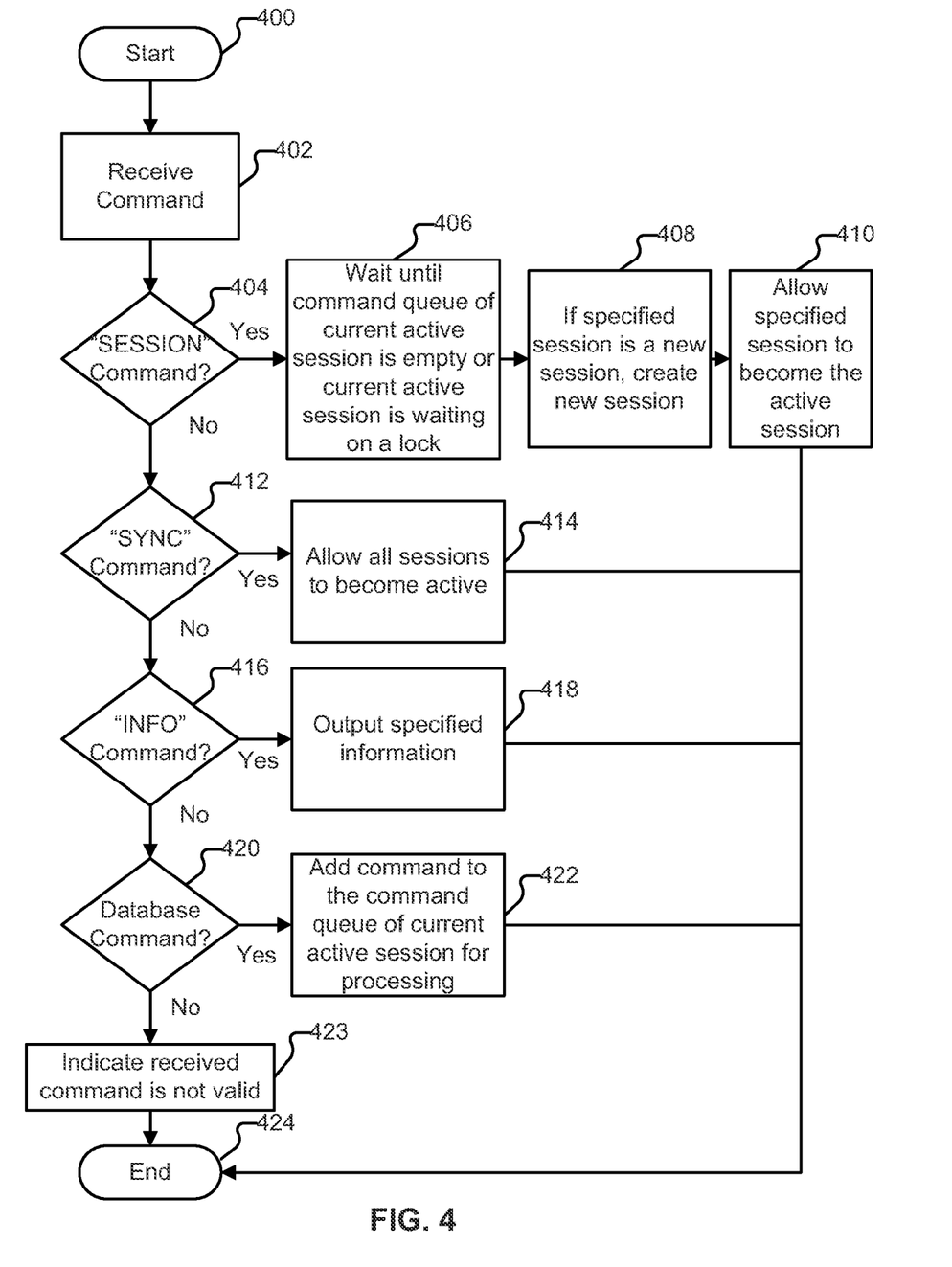
FIG. 4 is flowchart illustrating an embodiment of a process for processing a command.

FIG. 4 is flowchart illustrating an embodiment of a process for processing a command. In some embodiments, at least a portion of the process of FIG. 4 is included in 306 of FIG. 3 and/or 206 of FIG. 2. The process begins at 400. In some embodiments, at least a portion of the process of FIG. 4 is performed by a coordinator thread established in 302 of FIG. 3. At 402, a command is received. In some embodiments, the received command is a command determined from a test description in 204 of FIG. 2. In some embodiments, the received command is a command obtained in 304 of FIG. 3.

At 404, if it is determined that the received command is "SESSION" control directive command (e.g., allowing a specified database session to become the active database session), the process continues to 406. An example syntax "SESSION" command is "SESSION <session_name>". This "SESSION" control directive command indicates that the identified session should become the current active session, enables processing of commands in a command queue of the identified session, and directs subsequently processed database commands (e.g., SQL commands) to be added to the command queue of the identified session until another "SESSION" control directive command indicates otherwise. However, the identified session does not become the active session until the currently active session has reached an idle state. For example, at 406, the process waits until a command queue of the current session is empty or the current active session is waiting on a concurrency control lock. When the command queue of the currently active session is empty, it indicates that the current session has finished processing its database commands. If the current session has a database command that is still pending, is it determined whether the database command is pending due to a concurrency lock or due to a processing time required by the database (e.g., long running query). If the command is pending due to its processing time, a check may be made periodically (e.g., after a determined time interval that increases each time the determination is made) to determine whether the database command is still pending due to a concurrency lock or due to the long processing time required to process the command. In some embodiments, a coordinator thread performs the check required to determine the status of commands and/or dependencies of commands being processed by the session threads.

After it is determined that the command queue is empty or a current session is waiting on a lock, at 408, a new session is created if the identified session to become the active session is a new session that has not yet been established. In some embodiments, creating the new session includes creating a new session thread to manage the new session. The new thread establishes the new session with the database and manages a command queue to store database command(s) desired to be issued to the database using the database session of the thread. When the session thread is associated with a session that has been identified as active (e.g., by a "SESSION" control directive command or a "SYNC" control directive command), the thread issues commands in its command queue one by one in a first in, first out order to the database via the thread's database session connection after each previously issued database command from the queue is completed. At 410, the specified session of the received command is allowed to become the active session and any pending database commands of the new active session are allowed to be processed, and the process ends at 424.

If the received command is not a "SESSION" control directive command in 404, and at 412, it is determined that the received command is a "SYNC" control directive command, the process continues to 414. At 414, all database sessions used to test a database are allowed to become active. For example, each database session of a plurality of database sessions used to test the database is allowed to process commands in its associated command queue (e.g., in a first in first out manner) until the command queues are empty. Database sessions are allowed to execute in parallel and when the command queues are empty, the sessions return to only allowing one session to be active at one given time. In some embodiments, each database session of the plurality of database sessions is allowed to process commands in its command queue until the command queue is empty or blocked on a concurrency lock that cannot be resolved. After 414, the process ends at 424.

If the received command is not a "SYNC" control directive command in 412, and at 416, it is determined that the received command is an "INFO" control directive command, the process continues to 418. In some embodiments, the "INFO" control directive command is associated with syntax "INFO <message_to_output>". At 418, message identified with the "INFO" command is outputted. For example, a message used for debugging the database is outputted to a result file and/or displayed to a user. After 418, the process ends at 424.

If the received command is not an "INFO" control directive command in 416, and at 420, it is determined that the received command is a database command, the process continues to 422. In some embodiments, the database command includes a command that is natively supported by a database system. For example, a SQL command is a database command. At 422, the received command is added to a command queue of the currently active session for processing. For example, the received command is added to the command queue of a database session thread and as long as the database session thread remains as the active session thread, command(s) in its queue are issued to a database for processing. Once the issued command is completed, the command is removed from the command queue. The commands in the queue may be processed in a first in first out order or in any other predetermined or dynamically determined order. After 422, the process ends at 424.

If it is determined that the received command is not a database command in 420, the process continues to 423 where it is indicated that the received command is not a valid command. In various embodiments, one or more other control directive commands or other types of commands may exist. For example, rather than indicating an error message at 423, detection and processing for another type of command is performed.

Figure 5:
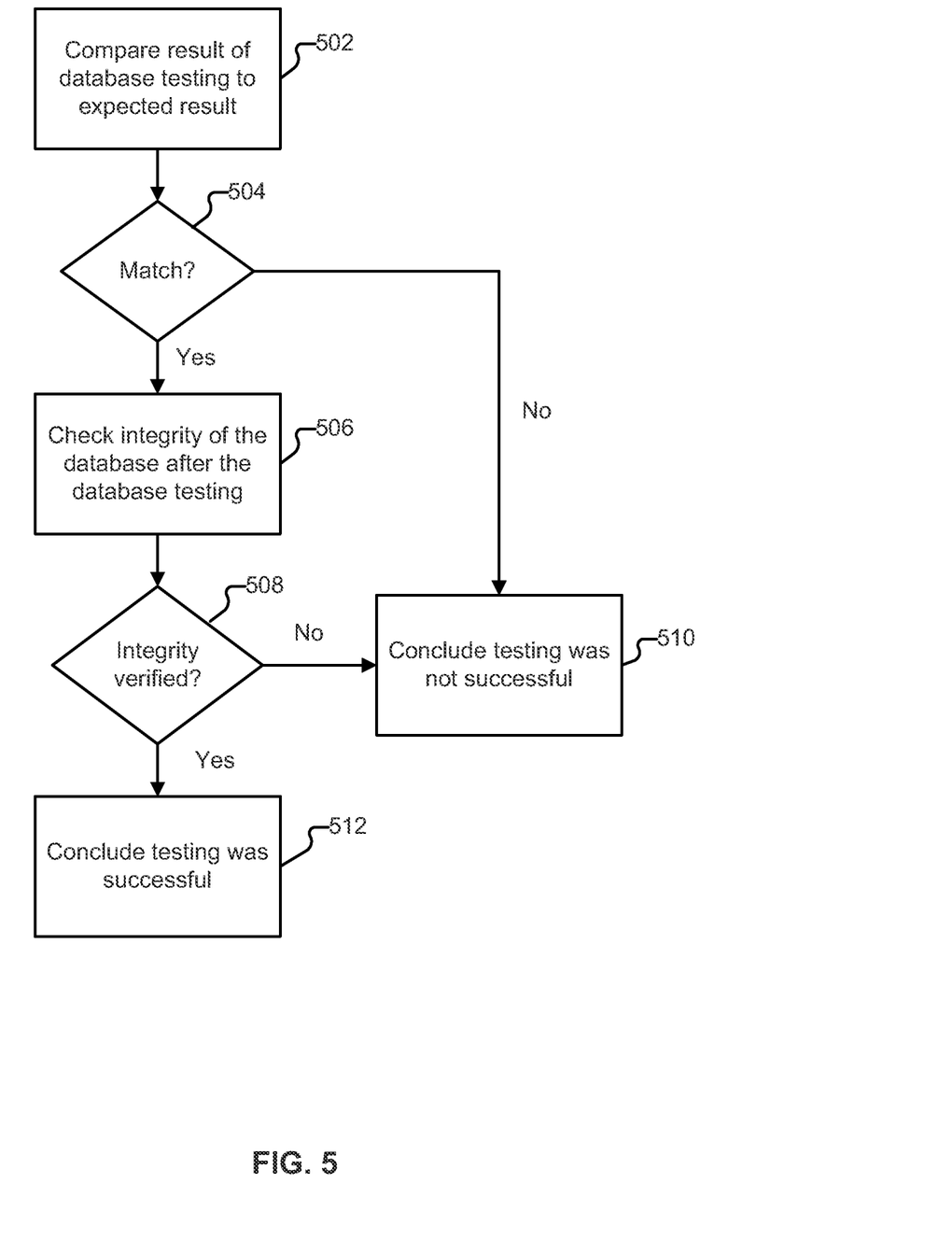
FIG. 5 is a flow chart illustrating an embodiment of a process for verifying a result of a database testing.

FIG. 5 is a flow chart illustrating an embodiment of a process for verifying a result of a database testing. In some embodiments, at least a portion of the process of FIG. 5 is included in 208 of FIG. 2. At 502, a result of the database testing is compared with an expected output. In some embodiments, the result of the testing includes one or more records of a database. In some embodiments, the result of the testing includes information outputted in 418 of FIG. 4. The expected output may include predetermined data and/or dynamically determined data. In some embodiments, comparing the testing result and the expected result includes determining which and/or how the results are different if the results are different.

If at 504 it is determined that the testing result and the expected output does match, at 506 integrity of the database after database testing is verified. In some embodiments, verifying the integrity of the database includes verifying that the tested database is in a consistent and correct state. For example, reference pointers included in the database are verified to ensure that the reference pointers reference correct data. If at 508 it is determined that the integrity of the database has been verified in 506, at 512 it is concluded that the testing of the database was successful. In some embodiments, concluding that the testing was successful means that ACID properties of the database were preserved during the testing of the database.

If at 504 it is determined that the testing result and the expected output do not match or at 508 it is determined that the integrity of the database is not verified, at 510 it is concluded that the testing was not successful. A reason for the unsuccessful conclusion may also be provided in addition to the conclusion. For example, which testing result was different from the expected result and/or which portion of the database failed the integrity verification may be provided.

Below is an example of a test description such as the test description received at 202 of FIG. 2.

--@ INFO Start Test
--@ SESSION 1
BEGIN;
LOCK TABLE x IN ACCESS EXCLUSIVE MODE;
--@ SESSION 2
BEGIN;
LOCK TABLE y IN ACCESS EXCLUSIVE MODE;
--@ SESSION 1
LOCK TABLE y IN ACCESS EXCLUSIVE MODE;
ABORT;
--@ SESSION 2
LOCK TABLE x;
ABORT;
--@ SYNC
--@ INFO End Test When the above example test description is used to test a database, the test description is tokenized to determine statement boundaries and identify specific commands specified in the description. The ordering of the commands in the test description is associated with an ordering of the commands that will be processed for execution. The following table includes a line by line explanation of the example test description.

| Test description line | Explanation |
| --- | --- |
| --@ INFO Start Test | Control directive command that outputs "Start Test". |
| --@ SESSION 1 | Control directive command that establishes a database session named "1" and sets session "1" as the currently active database session. |
| BEGIN; | "BEGIN" SQL database command is added to command queue of currently active session "1" and this command is issued to the database for processing. This command is then removed from the queue after completion of the command. |
| LOCK TABLE x IN ACCESS EXCLUSIVE MODE; | "LOCK TABLE x IN ACCESS EXCLUSIVE MODE" SQL database command added to command queue of currently active session "1" and this command is issued to the database for processing. Session "1" holds lock on table x. This command is then removed from the queue after completion of the command. |
| --@ SESSION 2 | Control directive command that establishes a database session named "2" and sets session "2" as the currently active database session. Because session "1" command queue is empty, the switch to session "2" as the active session does not have to wait. Session "1" is no longer active. |
| BEGIN; | "BEGIN" SQL database command is added to command queue of currently active session "2" and this command is issued to the database for processing. This command is then removed from the queue after completion of the command. |
| LOCK TABLE y IN ACCESS EXCLUSIVE MODE; | "LOCK TABLE y IN ACCESS EXCLUSIVE MODE" SQL database command added to command queue of currently active session "2" and this command is issued to the database for processing. Session "2" now holds lock on table y. This command is then removed from the queue after completion of the command. |
| --@ SESSION 1 | Control directive command that sets session "1" as the currently active database session. Because session "2" command queue is empty, the switch to session "1" as the active session does not have to wait. Session "2" is no longer active. |
| LOCK TABLE y IN ACCESS EXCLUSIVE MODE; | "LOCK TABLE y IN ACCESS EXCLUSIVE MODE" SQL database command added to command queue of currently active session "1" and this command is issued to the database for processing. Because session "2" holds the lock on table y, this command is blocked and waiting on the table y lock. |
| ABORT; | "ABORT" SQL database command is added to command queue of currently active session "1" and this command is not yet issued and queued for processing because an earlier command of session "1" is waiting on the table y lock and has not completed processing. |
| --@ SESSION 2 | Control directive command that sets session "2" as the currently active database session. Because session "1" is waiting on a lock, the switch to session "2" as the active session does not have to wait. Session "1" is no longer active. |

| Test description line | Explanation |
| --- | --- |
| LOCK TABLE x; | "LOCK TABLE x" SQL database command added to command queue of currently active session "2" and this command is issued to the database for processing.<br>Because session "1" holds the lock on table x, while waiting for lock on table y and session "2" holds the lock on table y while waiting for the lock on table x, this database command introduces a deadlock.<br>The deadlock should be detected by the database and it should abort session "2" if the database is functioning properly because session "2" is the session that introduced the deadlock. |
| ABORT; | "ABORT" SQL database command may be added to command queue of currently active session "2" depending on the state of session "2". |
| --@ SYNC | "SYNC" control directive command instructs all sessions, sessions "1" and "2", to become active. If session "2" aborted its lock on table y due to the deadlock, session "1" may obtain the lock on table y and continue processing queued commands. This control directive command waits for all sessions to clear their command queues when possible before completion. |
| --@ INFO End Test | Control directive command that outputs "End Test" |

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of testing a database, comprising:
receiving, by a database system including one or more processors, a test description defining a test of a database;
determining, by the database system and from the test description, a sequence of commands including control directive commands and database commands, each control directive command defining a database session, each database command being associated with a respective control directive command and defining a database operation to be performed in the database session of the associated control directive command, an order of the control directive commands in the sequence indicative of an order of activating the corresponding database sessions, wherein a control directive command appearing earlier in the sequence corresponds to an earlier activation of a respective database session;
activating, by the database system, a series of database sessions according to the order of the control directive commands in the sequence, the series of database sessions including a first session and a second session that follows the first session in the series;
assigning each database command to a command queue of a respective database session;
executing the database commands in sequence, wherein each database command, after completing execution, is removed from a respective command queue, and the second session is activated after the command queue of the first session is empty and after the first session is no longer active; and
providing a result of executing the database commands to a tester as a result of the test defined in the test description.

2. The method of claim 1, wherein each control directive command includes an identifier identifying a respective database session.

3. The method of claim 1, wherein the database system includes a master host interconnected with a plurality of segment hosts, and the database sessions are created by the segment hosts.

4. The method of claim 1, wherein each database session is managed by a respective database connection thread established for the database session, each database connection thread releases the database commands one by one, in first-in-first-out order, to the database via the respective database session.

5. The method of claim 1, wherein the test description includes a control directive command that specifies that a constraint on a relative timing between a first database command and a second database command does not need to be met after the first database command is issued before the second database command is issued, the constraint on relative timing specifying that before the second database command can be issued, the first database command must be completed or the first session must be waiting to acquire a lock.

6. The method of claim 1, wherein the sequence of commands includes a control directive command specifying that the first database session is to be reactivated after the second session is no longer active.

7. The method of claim 1, wherein the test description includes a synchronization control directive command that causes all database sessions to become active.

8. The method of claim 1, comprising starting a coordinator thread that monitors the database for a deadlock condition.

9. A system, comprising:
a master host including a processor;
a plurality of segment hosts each including a respective processor; and
a non-transitory computer readable storage medium storing instructions for causing one or more hosts of the system to perform operations comprising:
receiving a test description defining a test of a database;
determining, from the test description, a sequence of commands including control directive commands and database commands, each control directive command defining a database session, each database command being associated with a respective control directive command and defining a database operation to be performed in the database session of the associated control directive command, an order of the control directive commands in the sequence indicative of an order of activating the corresponding database sessions, wherein a control directive command appearing earlier in the sequence corresponds to an earlier activation of a respective database session;
activating a series of database sessions according to the order of the control directive commands in the sequence, the series of database sessions including a first session and a second session that follows the first session in the series;
assigning each database command to a command queue of a respective database session;
executing the database commands in sequence, wherein each database command, after completing execution, is removed from a respective command queue, and the second session is activated after the command queue of the first session is empty and after the first session is no longer active; and configuring providing a result of executing the database commands to a tester as conduct a result of the test defined in the test description.

10. The system of claim 9, wherein each database session is managed by a respective database connection thread established for the database session, each database connection thread releases the database commands one by one, in first-in-first-out order, to the database via the respective database session.

11. The system of claim 9, wherein the test description includes a control directive command specifying that relative timing between a first database command and a second database command does not need to be met after the first database command is issued before the second database command is issued.

12. The system of claim 9, wherein the sequence of commands includes a control directive command specifying that creating a first command queue associated with the first session and configured to be able to include the first command database session is to be reactivated after and creating a second command queue associated with the second database session and configured to be able to include the second command is no longer active.

13. The system of claim 9, wherein the test description includes a synchronization control directive command that causes all database sessions to become active.

14. A non-transitory computer readable storage medium storing computer instructions that, when executed by a database system comprising one or more processors, cause the database system to perform operations comprising:

receiving a test description defining a test of a database;

determining, from the test description, a sequence of commands including control directive commands and database commands, each control directive command defining a database session, each database command being associated with a respective control directive command and defining a database operation to be performed in the database session of the associated control directive command, an order of the control directive commands in the sequence indicative of an order of activating the corresponding database sessions, wherein a control directive command appearing earlier in the sequence corresponds to an earlier activation of a respective database session;

activating a series of database sessions according to the order of the control directive commands in the sequence, the series of database sessions including a first session and a second session that follows the first session in the series;

assigning each database command to a command queue of a respective database session;

executing the database commands in sequence, wherein each database command, after completing execution, is removed from a respective command queue, and the second session is activated after the command queue of the first session is empty and after the first session is no longer active; and configuring providing a result of executing the database commands to a tester as conduct a result of the test defined in the test description.

15. The non-transitory computer readable storage medium of claim 14, wherein the test description includes a control directive command that specifies that a constraint on a relative timing between a first database command and a second database command does not need to be met after the first database command is issued before the second database command is issued, the constraint on relative timing specifying that before the second database command can be issued, the first database command must be completed or the first session must be waiting to acquire a lock.

16. The non-transitory computer readable storage medium of claim 14, wherein each database session is managed by a respective database connection thread established for the database session, each database connection thread releases the database commands one by one, in first-in-first-out order, to the database via the respective database session.

17. The non-transitory computer readable storage medium of claim 14, wherein the sequence of commands includes a control directive command specifying that the first database session is to be reactivated after the second database session is no longer active.

18. The non-transitory computer readable storage medium of claim 14, wherein the test description includes a synchronization control directive command that causes all database sessions to become active.

19. The non-transitory computer readable storage medium of claim 14, the operations comprising starting a coordinator thread that monitors the database for a deadlock condition.

20. The non-transitory computer readable storage medium of claim 14, wherein the test description includes an information control directive command that outputs the result of the test.

* * * * *